United States Patent [19]

Duke

[11] Patent Number: 4,486,855
[45] Date of Patent: Dec. 4, 1984

[54] ACTIVITY DETECTOR USABLE WITH A SERIAL DATA LINK

[75] Inventor: Jack R. Duke, San Marcos, Calif.

[73] Assignee: NCR Corporation, Dayton, Ohio

[21] Appl. No.: 343,140

[22] Filed: Jan. 28, 1982

[51] Int. Cl.³ .............................................. G06F 3/04
[52] U.S. Cl. ..................................... 364/900; 371/22
[58] Field of Search ... 364/200 MS File, 900 MS File; 371/9, 11, 22, 62, 65

[56] References Cited

U.S. PATENT DOCUMENTS

| | | | |
|---|---|---|---|
| 3,810,120 | 5/1974 | Huettner et al. | 364/200 |
| 4,340,965 | 7/1982 | Beckman et al. | 371/62 |
| 4,374,436 | 2/1983 | Armstrong | 371/11 |
| 4,379,340 | 4/1983 | Holtey et al. | 364/900 |
| 4,380,052 | 4/1983 | Shima | 364/900 |
| 4,409,656 | 10/1983 | Andersen | 364/200 |
| 4,410,985 | 10/1983 | Yasumoto et al. | 371/22 |
| 4,418,409 | 11/1983 | Queen | 370/104 |

Primary Examiner—Raulfe B. Zache
Assistant Examiner—A. E. Williams, Jr.
Attorney, Agent, or Firm—J. T. Cavender; Floyd A. Gonzalez; Arthur A. Sapelli

[57] ABSTRACT

An activity detector device detects the presence or absence of information transmission over a serial data link between a computer system and a peripheral device. If a presence of a data signal exists as determined by the activity detector, the data signal is transmitted through to the computer system. If an absence of the data signal exists as determined by the activity detector, the input transmission link is decoupled from the computer system by the activity detector and places an all ones signal on the input line to the computer system consistent with the I/O protocol.

8 Claims, 7 Drawing Figures

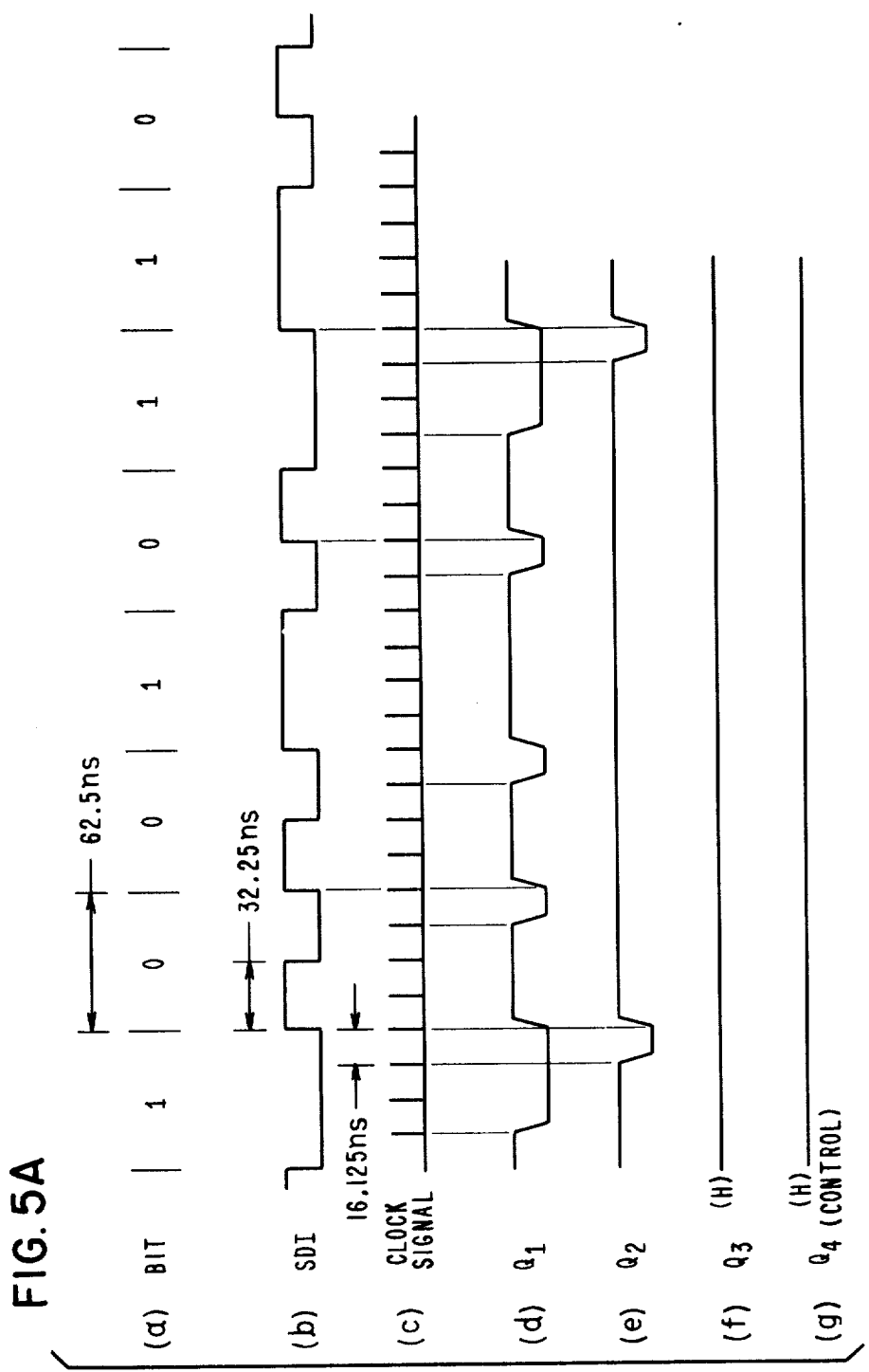

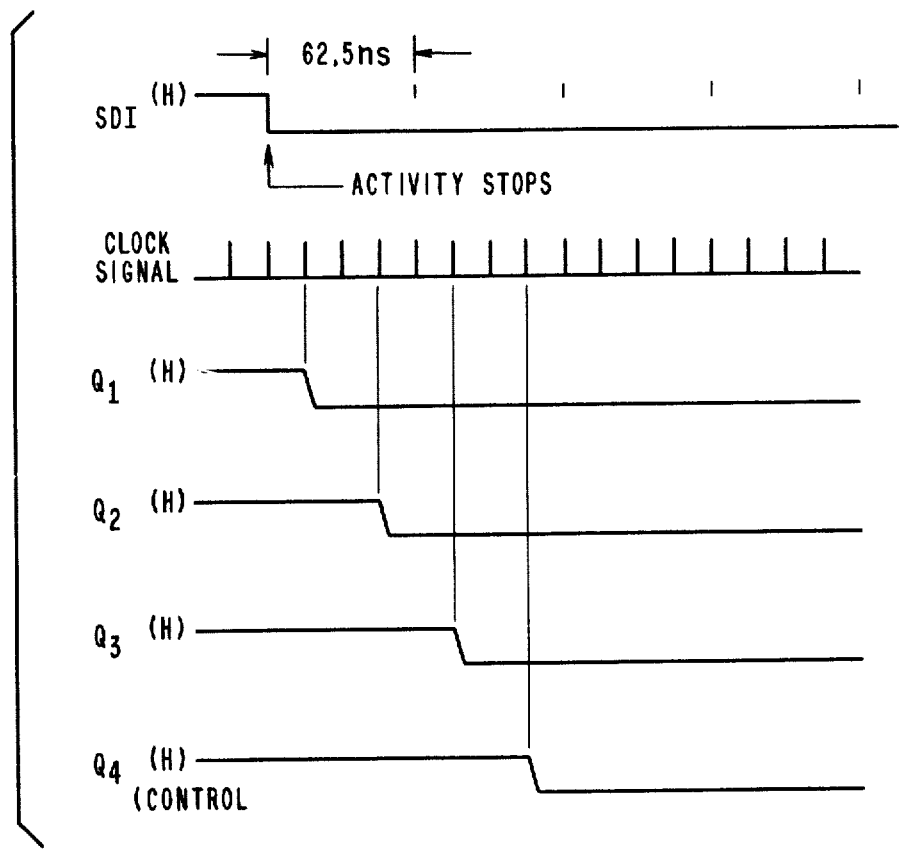

ACTIVITY DETECTOR USABLE WITH A SERIAL DATA LINK

FIELD OF THE INVENTION

This invention relates to I/O transmissions in data processing systems and more particularly to a device for detecting the presence or absence of information transfers between a computer system and one of a plurality of peripherals shared in common with the other computer systems.

RELATED PATENT APPLICATIONS

This invention may be employed in a data processing system such as that disclosed in U.S. patent application Ser. No. 168,896, filed July 11, 1980, entitled "Serial Channel Control Processor", by Venu Chari and Jack R. Duke (now abandoned), and U.S. patent application Ser. No. 168,897, filed July 11, 1980, entitled "Message Protocol Module", by Venu Chari and John L. Costa (now abandoned), both applications assigned to the same assignee as the present application.

BACKGROUND OF THE INVENTION

In data processing or computer systems, also denoted herein as a central system, having at least one processor, many methods exist for interfacing the processors of the data processing systems to shared peripheral devices. The processors may time share a peripheral on a time basis or the processors may be connected to a shared peripheral via an adapter, the adapter allocating the shared peripheral to the processors on a request basis. Another recognized architecture for processor communication with a shared peripheral is through the use of a common bus. In these aforementioned system configurations, the sharing of the common peripherals is a so-called dynamic state, i.e., the sharing is varying rapidly under the action of the data processing system. In a non-dynamic state, i.e. where the peripherals are manually switched to a processor by operator intervention, there exists the possibility that a processor may be switched to a peripheral port which does not have a peripheral or the peripheral is powered off. A port so connected will pick up and amplify noise from a connected cable or open connector. This amplified noise may be sensed by the processor, creating error messages to the processor.

Therefore, there exists a need to have a device which can sense information transfer activity on the transmission path or link thereby being capable of inhibiting noise from being transmitted to the processor. Although the device can be utilized in the dynamic state as well as the non-dynamic state, the device may not be as applicable in the dynamic state since the switching is performed by the data processing system and, as such, is not prone to the human error factor.

Accordingly, it is an object of the present invention to provide a device for detecting transmission activity via a link from a peripheral device to a data processing system.

This and other objects of the present invention will become more apparent when taken in conjunction with the following description and attached drawings, wherein like characters indicate like parts, and which drawings form a part of the present application.

SUMMARY OF THE INVENTION

The present invention relates to a device for detecting information on a data line which comprises a propagation element which has an input and an output terminal, the input terminal adapted to receive an input signal which alternates between a first and second state indicative of the data contained therein. The propagate element propagates the second state of the input signal to the output terminal. The propagation element is further capable of being conditioned by the first state of the input signal thereby terminating the propagation of the second state. A sensing element, operatively connected to the output terminal of the propagation element, and further operatively connected to the input terminal for initializing the sensing element by the first state of the input signal, generates an output here signal upon detecting the existence of the second state at the output terminal, the output signal indicating the absence of the input signal.

In a data link for transmitting a serial data signal between a data sending system and a data receiving system wherein the data of said data signal is transmitted in a series of binary bits in which said binary bits have a first value when the state of said data link has a set number of transitions between two signal levels during a select period of time, and said binary bits have a second value when the state of said data link has a second lesser number of such transitions during the select period of time, a preferred embodiment of an activity detector includes a clock signal generator for generating a clock signal having a select number of transitions during the select period of time, a bit signal generator connected to the clock signal generator for generating responsive to the clock signal, a bit signal having a series of bits of a single value during the select time period, a signal detector for detecting activity on the data link, and a multiplexer having a first input for receiving the data signal, a second input connected to the bit signal generator, and a control terminal connected to the signal detector. The signal detector has a first input for receiving the data signal, a second input connected to the clock signal generator for receiving the clock signal, and a control signal output for outputting a control signal responsive to the data signal and the clock signal. The control signal output from the signal detector is a first voltage level continuously responsive to data signal transitions of a desired polarity, and a second voltage level continuously responsive to the absence of data signal transitions during the select number of clock signal transitions. The multiplexer is controlled by the control signal output of the signal detector such that when the control signal is at its first voltage level, the data signal is passed, and when the control signal has its second voltage level, the data signal is blocked by the multiplexer and the bit signal is passed.

BRIEF DESCRIPTION OF THE DRAWINGS

FIG. 5A shows the signal waveforms of the signal detector;

FIG. 5B shows the waveforms of the signal detector when the transmission activity ends.

DETAILED DESCRIPTION

Figure 1:
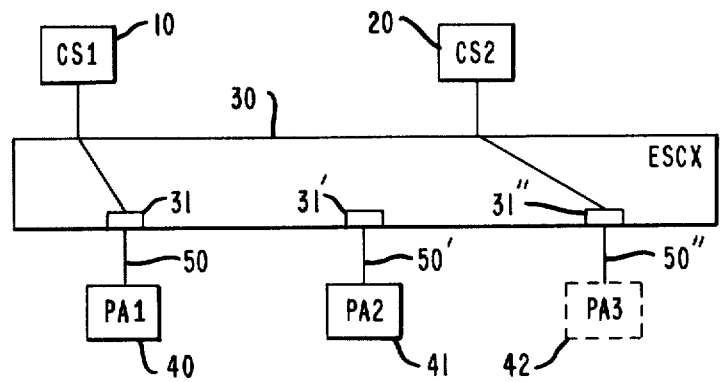
FIG. 1 is an overview of the central system environment in which the present invention finds application.

Referring to FIG. 1, there is shown in a preferred embodiment, a first central system 10 and a second central system 20 (CS1 and CS2 respectively) which are connected to an external static channel exchange (ESCX) 30 through which CS1 and CS2 can access the various peripheral adapters, PA1, PA2, ..., the peripheral adapters each being connected to a respective port 31, 31', 31" of the ESCX 30 by its associated cable 50, 50', 50". The ESCX 30 is a switching interface which provides serial data link communication paths between a central system and a peripheral adapter. CS1 is shown connected to PA1 40. The operation of the ESCX 30 is such that a manual operation is required to connect CS1 and PA2, PA3, .... A central system can also be connected, via the ESCX 30, to the port 31" which has no PA connected. Such a condition is depicted by CS2, which is shown connected to the port 31" which does not have a PA attached thereto (denoted by the dotted lines of PA3).

As a result, noise pick-up associated with port 31" may cause CS2 to accept the noise pick-up as an input transmission. The input transmission is then subject to being checked by the CS2 in accordance with an IOSS protocol. (The IOSS (input-output subsystem) protocol is described in detail in the aforementioned related patent applications, and will not be described herein. The aforementioned related patent applications are incorporated by reference herein to the extent necessary for understanding the present invention). The input transmission will more than likely result in error indications to the CS2.

Figure 2:
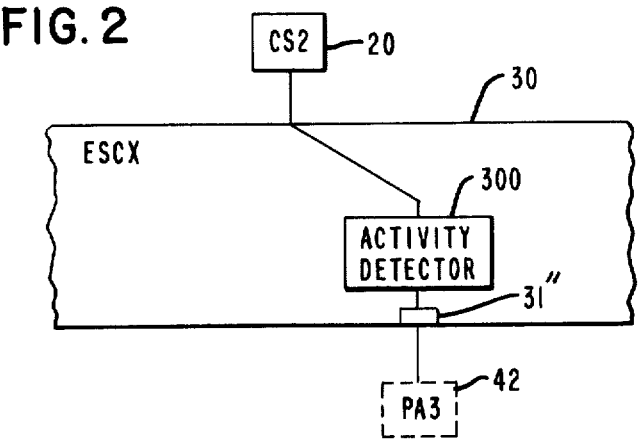
FIG. 2 shows the location of the present invention within the environment of FIG. 1.

In order to circumvent these error indications caused by the noise pick-up when no PA is attached to a port, an activity detector is included within the transmission path or link between the CS and the PA. Referring to FIG. 2, the activity detector 300 is shown as an element of the ESCX 30 in the path between the port 31" and CS2 20. It is to be understood that the activity detector 300 may be in the transmission link from the CS as well as to the CS.

Figure 3:
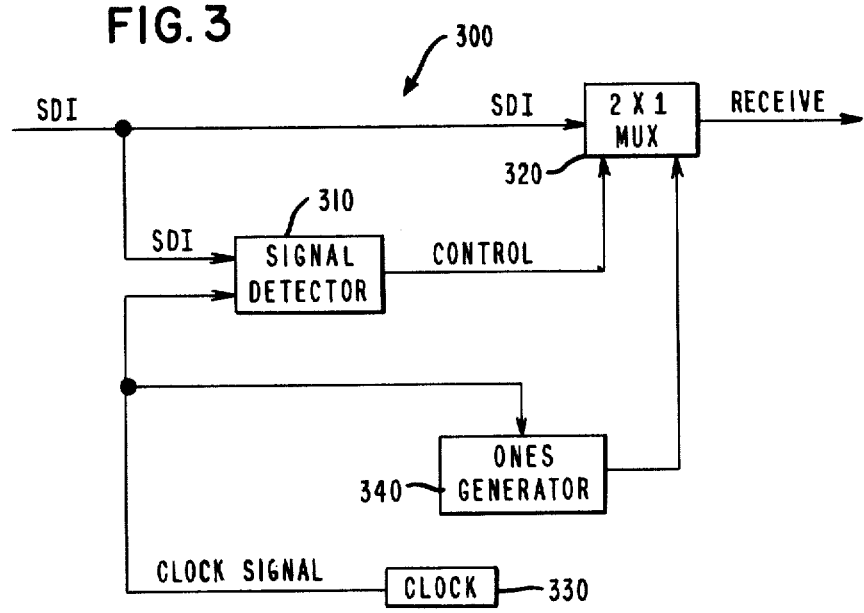
FIG. 3 shows a block diagram of the preferred embodiment of an activity detector.

Referring to FIG. 3 there is shown a block diagram of the preferred embodiment of the activity detector 300. The activity detector 300 receives an input signal, the input signal being a serial data input (SDI), which is coupled to a signal detector 310 and a multiplexer (MUX) 320, the MUX being a 2×1 MUX. A clock 330 which generates a clock signal is coupled to the signal detector 310 and to a ones generator 340. The output of the ones generator 340 is a ones signal (ONES) which is coupled to the MUX 320. If a serial data input signal is present at the input of activity detector 300 as determined by the signal detector 310, the output signal from the signal detector (CONTROL) has a logic "one" or high state such that the MUX 320 is conditioned to pass the SDI signal to the output of the MUX 320, the output of the MUX being the signal passed to the central system, or the receive signal (RECEIVE). If the serial data input signal is not present at the input of activity detector 300 as determined by the signal detector 310, the CONTROL signal from the signal detector 310 is conditioned to a logic "zero" or low state effectively decoupling the input of the activity detector 300 from the output of MUX 320. In the preferred embodiment, the CONTROL signal in a low state causes the MUX 320 to be switched such that the ONES signal is outputted from MUX 320, the RECEIVE signal in this case being the ONES signal consistent with the IOSS protocol.

Figure 4:
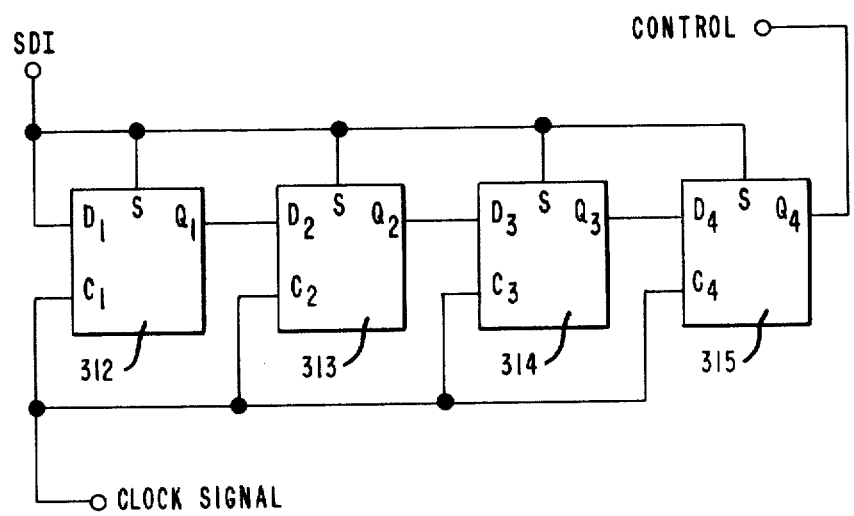
FIG. 4 shows a logic diagram of a signal detector of the preferred embodiment of the activity detector.

Referring to FIG. 4 there is shown a logic diagram of the signal detector 310 of the preferred embodiment. The signal detector 310 of the preferred embodiment is comprised of four toggle or memory-type elements, or more specifically D type flip-flops (F/F) 312, 313, 314, 315. The first flip-flop 312 has its input (D), or D input, adapted to receive the serial data input signal (SDI). The unconditional set input (S) of all flip-flops of the signal detector 310 also have coupled thereto the SDI signal. The clock input (C) of all the flip-flops are coupled to the clock signal. The D input of the second, third and fourth flip-flops, 313, 314, 315, have their respective D inputs coupled to the output (Q) of the preceding flip-flop in a chain-like arrangement. The output of the fourth or last flip-flop 315 is the output of the signal detector 310, or the CONTROL signal. The signal detector 310 of the preferred embodiment is comprised of two 10131 high speed dual D flip-flops. The 2×1 MUX 320 of the preferred embodiment is a 10159 integrated circuit chip.

The operation of the flip-flops of the signal detector 310 can be seen by referring to FIGS. 5A and 5B. Waveform A shows the bit significance of the SDI signal (waveform b). Waveform c shows the clock signal which is asynchronous to the SDI signal, the frequency of the clock being equal to twice the high frequency of the SDI signal of waveform b. Waveforms d through g show the respective ouputs of the flip-flops 312 (Q1), 313 (Q2), 314 (Q3) and 315 (Q4). As indicated above, the output of the fourth flip-flop 315 is the CONTROL signal (waveform g). When the serial data input signal is high, the flip-flops of the signal detector 310 are set via the S input. This causes the CONTROL signal (the output of the fourth flip-flop, Q4, waveform g) to be in a high state. The CONTROL signal, which is coupled to MUX 320, is forced to remain high while the SDI signal is high. When the SDI signal is low, the output of F/F 312, Q1, will go low coincident with a clock signal. However, the serial data input signal must stay low for at least three clock cycles for the CONTROL signal to go low (see FIG. 5B). From waveform b, it can be seen that the nature of the SDI signal is such that the SDI signal changes state (high to low or low to high) at a rate which is lowest for consecutive ones and highest for consecutive zeros. Hence, before the low state of the SDI signal detected by first F/F 312 has a chance of propagating through the fourth F/F 315, the first F/F 312 will be set, along with all the other F/Fs, causing the propagation action to start over. When this type of transmission activity is sensed, the CONTROL signal will always remain high. When the serial data input signal goes low for three clock cycles as shown in FIG. 5B, the input signal passes, in turn, through each of the clocked flip-flops of the signal detector 310, the CONTROL signal finally going low indicating there is no activity on the attached link. It can be seen by one skilled in the art that the number of F/F stages of the signal detector 310 is a function of the SDI signal frequency with respect to the nature of the noise signal being encountered.

Figure 6:
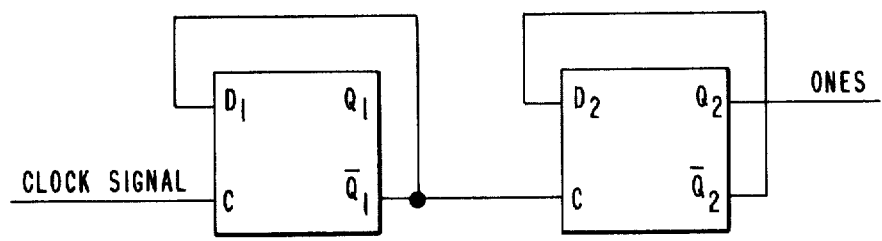
FIG. 6 shows a logic diagram of a ones generator of the preferred embodiment of the signal detector.

FIG. 6 shows a logic diagram of the ones generator 340. The ones generator 340 comprises two D type flip-flops which divide the clock signal by four, producing the ONES signal. In the preferred embodiment, the 32 MHz clock signal input to the ones generator 340 is divided to produce the required 8 MHz ONES signal which is output on the transmission link consistent with the IOSS protocol referred to above. The flip-flops of the preferred embodiment of the ones generator 340 are 10131 integrated circuit chips.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. In a data link for transmitting a serial data signal between a data sending system and a data receiving system wherein the data of said data signal is transmitted in a series of binary bits in which said binary bits have a first value when the state of said data link has a set number of transitions between two signal levels during a select period of time, and said binary bits have a second value when the state of said data link has a second lesser number of such transitions during said select period of time, an activity detector comprising:
    clock signal generating means for generating a clock signal having a select number of transitions during said select period of time;
    a bit signal generating means connected to said clock signal generating means for generating responsive to said clock signal, a bit signal having a series of bits of a single value during said select time period;
    signal detector means having a first input for receiving said data signal, a second input connected to said clock signal generating means for receiving said clock signal, and a control signal output for outputting a control signal responsive to said data signal and said clock signal at said first and second inputs respectively, said control signal having a first voltage level continuously responsive to data signal transitions of a desired polarity, and a second voltage level continuously responsive to the absence of data signal transitions during said select number of clock signal transitions; and
    multiplexer means having a first input for receiving said data signal, a second input connected to said bit signal generating means, a control terminal connected to the control signal output of said signal detector means and an output; said multiplexer means being operable for passing only said data signal when said control signal has its first voltage level, and for passing only said bit signal when said control signal has its second voltage level such that said data signal is blocked and said bit signal is output from said multiplexer means when there is no activity on said data link for a set number of clock signal transitions.

2. The activity detector of claim 1 wherein said activity detector comprises:
    a multi-stage propagating means having a set number of stages, a data input connected to said signal detector first input, and a clock input connected to said signal detector second input; said propagating means operable for propagating a data signal voltage level along said set number of stages responsive to clock signals at said clock input, and including means for terminating the propagation of said data signal voltage level and setting each stage of said multi-state propagating means to a desired condition upon the arrival of a data signal transition at said data input.

3. The activity detector of claim 2 wherein said multi-stage propagating means comprises a plurality of serially connected D-type flip-flops each having a data terminal, a clock terminal, an output terminal, and a set terminal;
    the first of said flip-flops having its data terminal connected to said propagating means data input, each of the other of said flip-flops having their input terminal connected to the output terminal of the preceding flip-flop, and the last of said flip-flops having its output terminal connected to the control signal output of said signal detector means.

4. The activity detector of claim 3 wherein the set terminals of said flip-flops are connected to said propagating means data input, and the clock terminals of said flip-flops are connected to said propagating means clock input such that data signal transitions of a select polarity simultaneously set all of said flip-flops, and clock signal transitions of a select polarity propagates a data signal voltage level along said flip-flops.

5. The activity detector of claim 4 wherein said multi-stage propagating means comprises at least four stages.

6. The activity detector of claim 5 wherein said clock signal generating means includes means for generating at least four transitions of a desired polarity during two of said select periods of time such that, in the absence of a data signal transition at said flip-flop set terminals, the voltage level of said data signal will be completely propagated through said multi-stage propagating means during two of said time periods, whereupon the propagated voltage level will change the voltage level of the control terminal of said multiplexer means so that said data signal is blocked and said bit signal is output from said multiplexer means.

7. The activity detector of claim 1 wherein said bit signal generating means comprises divider means having an output and an input connected to said clock signal generating means; said divider means being responsive to said clock signal for generating bit signal transitions at said divider output whose intervals therebetween are even multiples of the intervals between transitions of said clock signal.

8. The activity detector of claim 7 wherein said bit signal transitions are the same in number as one of the set numbers of said binary bit values of said data link.

* * * * *